June 19, 1928. M. L. NELSON Re. 17,006

CODE SIGNALING SYSTEM

Original Filed May 10, 1922 4 Sheets-Sheet 1

Inventor
Marlin L. Nelson
Chas. W. Candy Atty.

June 19, 1928. M. L. NELSON Re. 17,006

CODE SIGNALING SYSTEM

Original Filed May 10, 1922 4 Sheets-Sheet 2

Inventor
Martin L. Nelson
Chas. Tu. Candy Atty.

June 19, 1928. M. L. NELSON Re. 17,006

CODE SIGNALING SYSTEM

Original Filed May 10, 1922 4 Sheets-Sheet 3

—Inventor—
Martin L. Nelson
Chas. W. Candy Atty.

June 19, 1928. M. L. NELSON Re. 17,006
CODE SIGNALING SYSTEM
Original Filed May 10, 1922 4 Sheets-Sheet 4
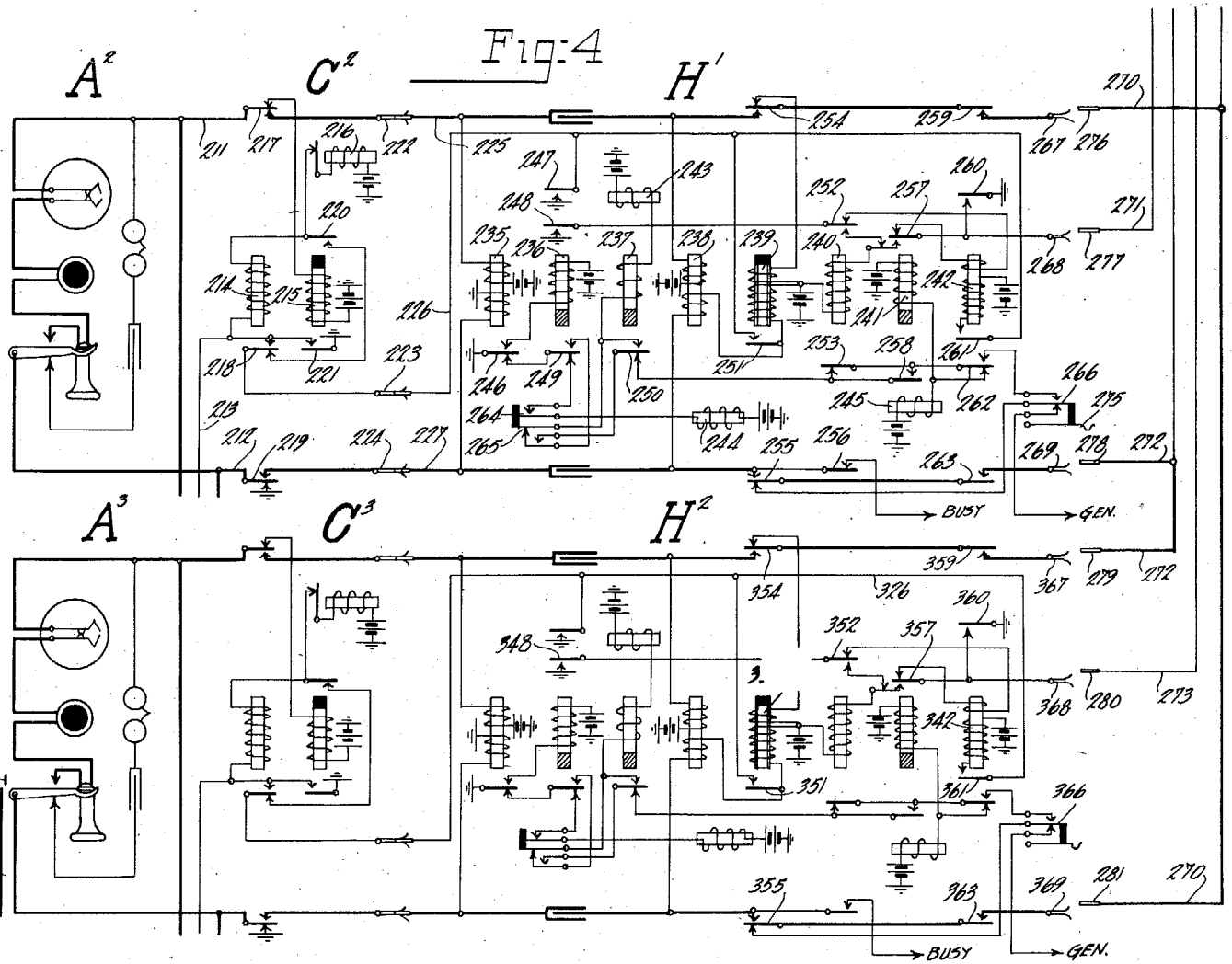
— Inventor —
Harlan L. Nelson
Chas. W. Candy Atty.

Reissued June 19, 1928. Re. 17,006

UNITED STATES PATENT OFFICE.

MARTIN L. NELSON, OF PARK RIDGE, ILLINOIS, ASSIGNOR TO AUTOMATIC ELECTRIC INC., OF CHICAGO, ILLINOIS, A CORPORATION OF DELAWARE.

CODE SIGNALING SYSTEM.

Original No. 1,585,909, dated May 25, 1926, Serial No. 559,769, filed May 10, 1922. Application for reissue filed June 23, 1927. Serial No. 201,013.

The present invention relates to private automatic exchanges in general, but is concerned more particularly with exchanges of this character which are provided with code signaling arrangements, whereby certain persons may be reached when they are absent from their offices on business in other departments; and the object generally stated is the provision of new and improved circuit arrangements tending to make a code signaling system of this sort more flexible in operation and more desirable from the standpoint of the user.

In order to explain the object above set forth a little more fully it may be stated that it has been the common practice to provide a single code switch which has two sets of terminals. The so-called calling set of these terminals is seized by an automatic switch under the control of a calling subscriber's calling device when a certain number is called. After this set of terminals is seized one or two additional digits are dialled in order to set up the code switch and cause it to send out the desired code. This code, it will be understood, is sent out over a circuit onto which may be multipled as many signal devices as desired, located at various points on the premises. When the wanted subscriber hears his code being sent out he responds by dialling a certain number known as the answering number, with the result that an automatic switch connects with the code switch at the other or so-called answering set of terminals. The two subscribers then proceed to converse with each other as desired.

According to one feature of the invention a code switch has been provided which is adapted for use with either a selector system or a connector system, that is the code switch may be used in a small system comprising line switches and connectors, in which case it will be accessible to the connectors, or it may be used in a larger system including selectors, in which case it will be reached from the selectors. Cases may arise also, as where a selector and a connector system are located in adjacent buildings, or in the same building perhaps, when it will be desirable to use the same code switch in both systems at the same time and this can be done.

Other features are the simplified wiring of the code switch bank, and the arrangement whereby the impulse switch is controlled to operate slowly during the ringing period and to speed up during the silent period. There are various other features of the invention which will not be pointed out specifically at this time, but which will become apparent in the detailed description hereinafter.

Referring to the drawings, Figs. 1 to 3, inclusive, when arranged in order with the corresponding lines at the ends thereof in alignment, represent by means of the usual circuit diagrams a sufficient amount of the apparatus in a selector system embodying the principles of the invention to enable the invention to be thoroughly understood. Figs. 3 and 4 diagrammatically represent a connector system. As most of the apparatus is old and well understood in the art, only a brief description will be given.

In Fig. 1, there are shown two subscribers' lines together with their associated substations and individual line switches, and also two of the selector switches to which the individual line switches have access.

Fig. 4 shows two subscribers' lines together with their associated substations and individual line switches and also two connector switches to which the individual line switches have access.

The substations A, $A^1$ $A^2$, and $A^3$ are of the usual automatic type, having the usual sending, signaling, and talking instrumentalities.

The line switches C to $C^3$, inclusive, are of the well-known rotary type in which the wipers have no normal position and move in a forward direction only.

Figure 3:
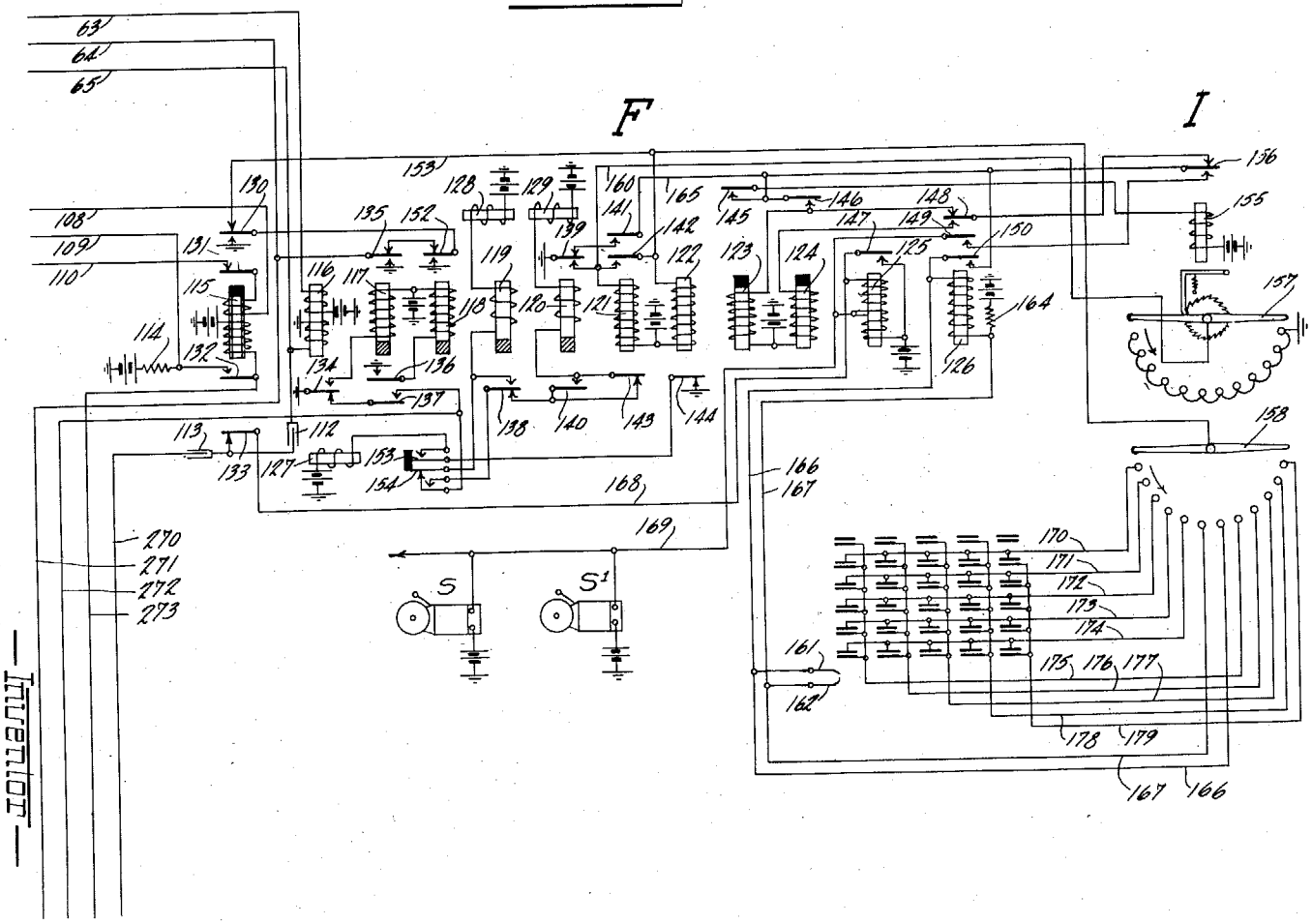
Fig. 3 shows the code switch, a portion of its banks, impulse switch I, and the signals S and $S^1$.

The impulse switch I, Fig. 3, which is associated with the code switch F, is mechanically similar in construction and operation to line switches C to $C^3$, inclusive, but its circuit differs as shown.

The selectors D and $D^1$, the connector switches H to $H^2$, inclusive, and the code switch F are of the well-known Strowger vertical and rotary type and accordingly, have their bank contacts arranged in horizontal rows or levels. The circuits are of a well-known type, except the circuit of the code switch F, which will be explained fully hereinafter.

Throughout the drawings two types of slow acting relays have been shown, one having its lower portion shaded to show that this relay is slow to fall back and appreciably fast to pull up while the relay having its upper portion shown in full black, in addition to being slow to fall back, is also slightly slow to pull up.

Figure 1:
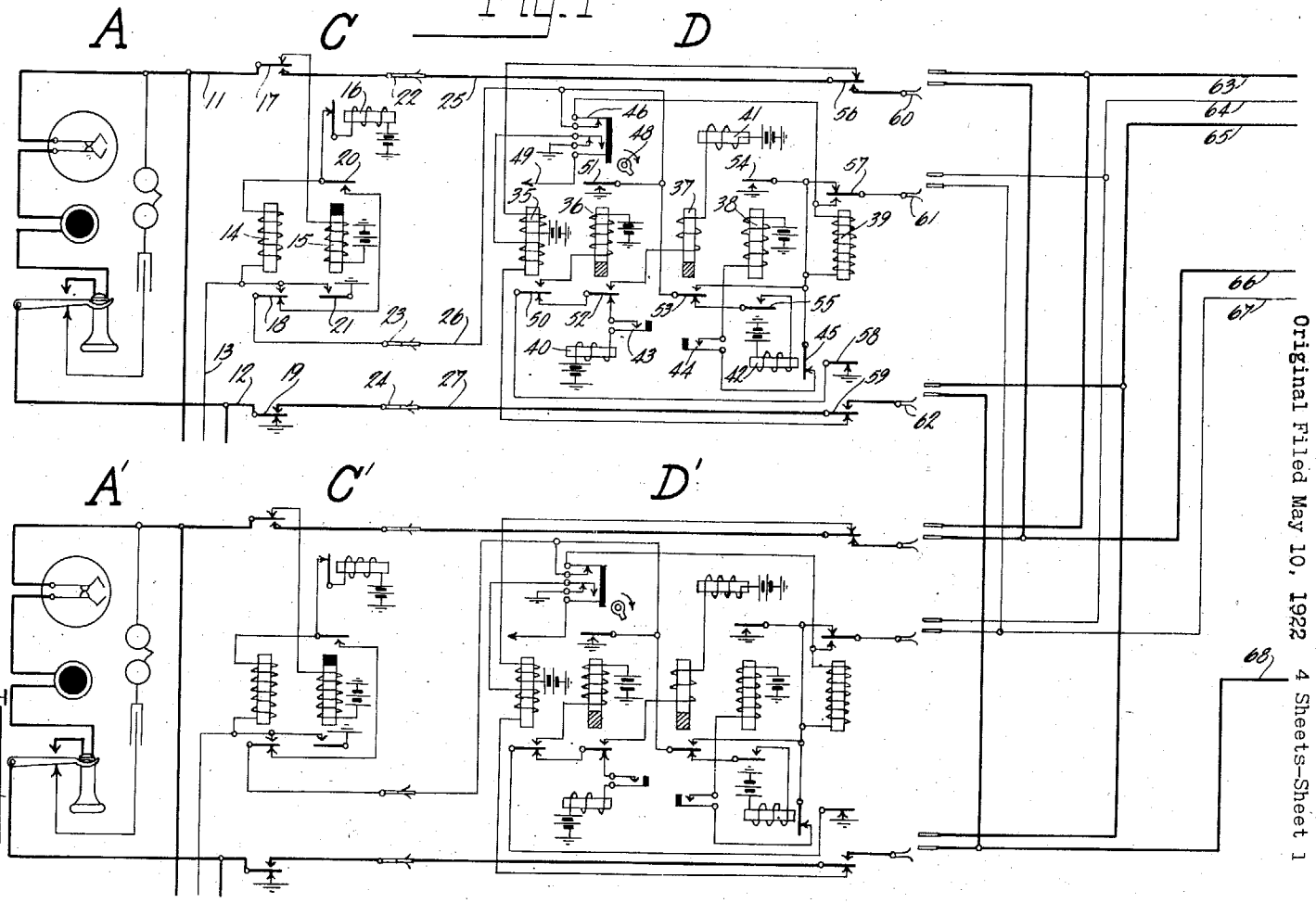
Figure 2:
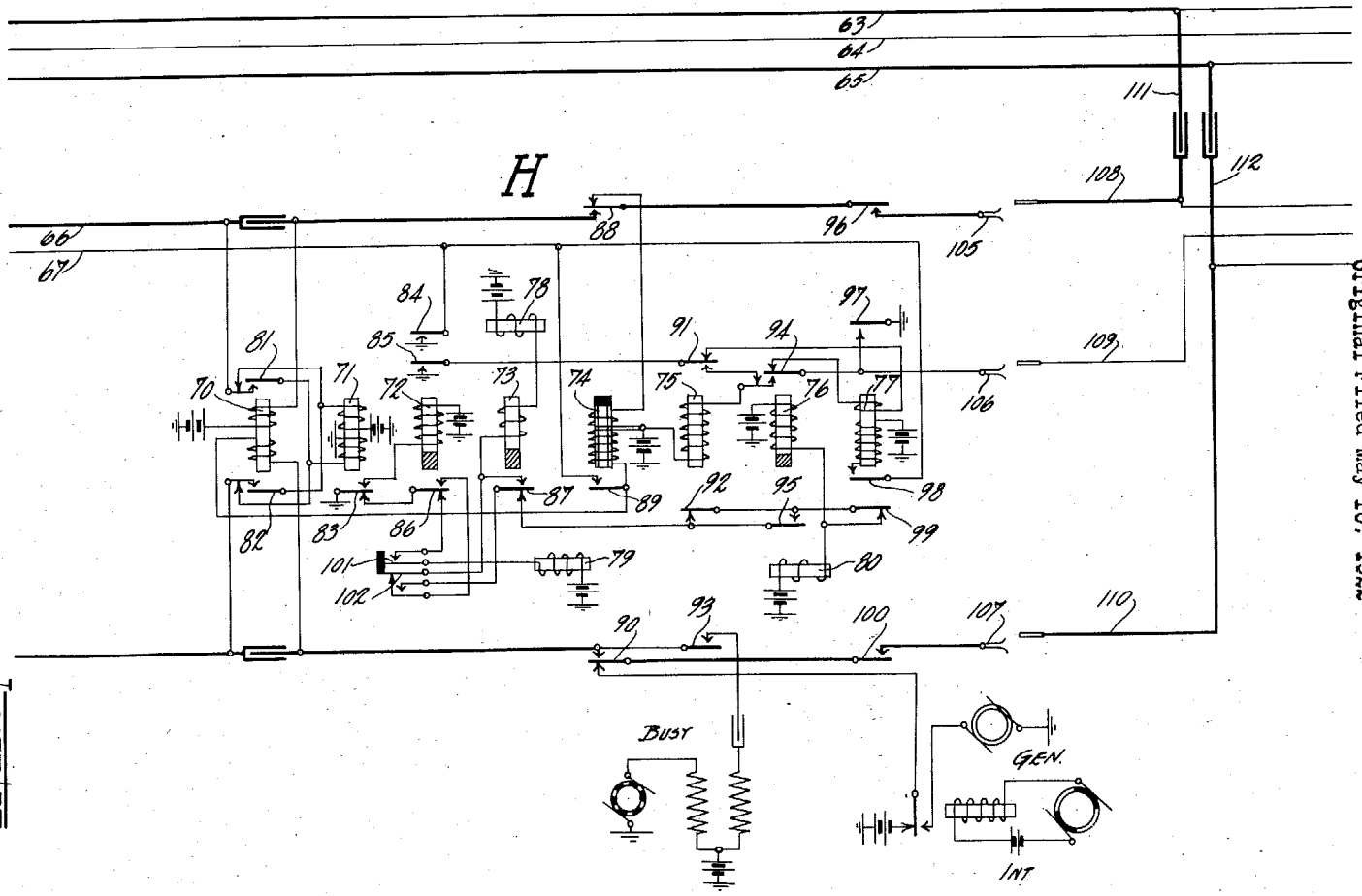
Fig. 2 shows a connector switch of the well known Strowger vertical and rotary type.

The apparatus having been described, the operation of the selector system will now be explained, reference being had to Figs. 1, 2, and 3. It will be assumed that the subscriber at substation A has called a certain other subscriber by way of the telephone at the latter's desk, and having received no response has released the connection and decided to try to reach the desired subscriber by sending out his code. It will be assumed further that the code of the subscriber wanted is 45 which comprises four rings or buzzes, pause, and five rings or buzzes. It will be assumed also that the called party is one whose business does not take him out of the building in which he works and in which the signals S and $S^1$ are located.

When the receiver is removed at substation A, a circuit is closed over line conductors 11 and 12 for the line relay 15 of line switch C. Line relay 15, upon energizing places ground upon private normal conductor 13 at armature 21, thereby causing the line of substation A to test busy to the automatic switches which have access to it, and also closes a circuit for switching relay 14 and stepping magnet 16 in series; and at armature 20 connects the test wiper 23 to a point midway between switching relay 14 and stepping magnet 16. The line switch C is now operated in the usual and well-known manner to pick out an idle trunk line. Assuming that the trunk line extending to the selector D is the first one found to be idle, when the wipers 22—24, inclusive, arrive upon the set of bank contacts in which the trunk line comprising conductors 25—27, inclusive, terminates, switching relay 14 energizes in series with stepping magnet 16, not having energized before on account of being short circuited by the ground potential which is present upon the test contacts of busy trunk lines. Stepping magnet 16, however, does not energize in series with switching relay 14 on account of the relatively high resistance of the relay. Upon energizing, switching relay 14 disconnects test wiper 23 from the point between its own winding and that of stepping magnet 16 and connects it to grounded private normal conductor 13 at armature 18, thereby making the seized trunk busy immediately by placing a ground potential upon release trunk conductor 26. As a further result of the energization of switching relay 14, it disconnects the line conductors 11 and 12 from the winding of line relay 15 and ground, respectively, and extends them by way of armatures 17 and 19 and their working contacts, wipers 22 and 24, conductors 25 and 27, and armatures 56 and 59 and their resting contacts to the upper and lower windings of line relay 35 of selector D. Line relay 35 now energizes over the calling subscriber's loop and at its armature 50 closes a circuit for release relay 36. Release relay 36, upon energizing, opens a point in the circuit of release magnet 40 and prepares a circuit for vertical magnet 41 at armature 52, and at armature 51 places ground upon release trunk conductor 26, thereby establishing a holding circuit for switching relay 14 of the line switch C before the slow acting line relay 15 has had time to deenergize.

The calling subscriber may now manipulate his calling device in accordance with the digit with which it is necessary to call in order to seize a code selector such as the selector F, thereby producing a corresponding number of interruptions in the circuit of line relay 35. Each time relay 35 deenergizes in response to one of these interruptions it completes a circuit for vertical magnet 41 as follows: from ground by way of the resting contact of armature 58 and said armature, armature 50 and its resting contact, armature 52 and its working contact, series relay 37 and vertical magnet 41 to battery. By the operation of vertical magnet 41, the shaft and wipers of the selector D are raised step by step until the latter come to rest opposite the desired level of bank contacts. Relay 37 is energized in series with vertical magnet 41 and being slow acting retains its armature attracted throughout the vertical movement. Off normal springs 44, upon closing as soon as the switch shaft is raised from its normal position, complete the following circuit for the stepping relay 38: from ground by way of release trunk conductor 26, armature 53 and its working contact, interrupter contacts 45 of rotary magnet 42, off normal contacts 44 and stepping relay 38 to battery. Stepping relay 38, upon energizing, closes a locking circuit for itself at armature 54, and at armature 55 prepares a circuit for rotary magnet 42.

It might be here stated that a certain one of the selector levels is allotted for calling the code switch and that the first set of contacts in such level is connected to conductors 63, 64 and 65 which terminate in the code switch F, while the remaining sets of contacts in the level are permanently made busy.

At the end of the vertical movement, relay 37, upon deenergizing, completes the circuit of rotary magnet 42 at armature 53. Rotary magnet 42, upon energizing, advances the switch wipers 60—62, inclusive into engagement with the first set of contacts in the level opposite which they are raised or the contacts terminating in conductors 63, 64 and 65, and at interrupter contacts 45 opens the circuit of stepping relay 38. Stepping relay 38, upon deenergizing, opens the circuit of rotary magnet 42 at armature 55, whereupon the said rotary magnet deenergizes and closes its interrupter contact again.

If the code switch F is busy, test conductor 64 will be grounded and the stepping relay 38 is energized again by way of test wiper 61 and armature 57 and its resting contact, with the result that the wipers are rotated into engagement with the next set of contacts. As all the remaining contacts in this level are permanently made busy this operation continues until the wipers are rotated to what is known as the eleventh contact busy position, that is, after the switch has tested all the contacts in this level and found them all busy the cam on shaft 48 engages and operates the cam springs shown at 46 on the eleventh rotary step of the shaft. The operation of the cam springs opens the circuit for the switching relay 39 so as to prevent said relay from energizing, and at the same time connects a busy tone over the subscriber's loop by way of conductor 49, the operated cam springs, lower winding of line relay 35, resting contact of armature 59 and said armature, the calling subscriber's loop, armature 56 and its resting contact, to the upper winding of line relay 35 and battery. The calling subscriber upon hearing the busy signal replaces his receiver on the switch hook and releases the operated switches.

Returning now to the end of the first rotary step in which the wipers have been rotated into engagement with the first set of contacts which terminate in conductors 63, 64 and 65 and assuming that the code switch F is idle, there will be no ground on conductor 64 and therefore no circuit will be closed for stepping relay 38.

Switching relay 39, which heretofore has been short circuited, energizes over the following circuit: from ground by way of release trunk conductor 26, resting contact of cam spring 46 and said spring switching relay 39, interrupter contacts 45, off normal contacts 44, and stepping relay 38 to battery. Stepping relay 38, however, due to its design and adjustment does not energize in series with switching relay 39, the latter relay having a relatively high resistance. Switching relay 39, upon energizing, removes ground from the armature of line relay 35 at armature 58; opens the test circuit and prepares the holding circuit at armature 57, thereby placing ground upon release trunk conductor 64 of the code switch F; and disconnects trunk conductors 25 and 27 from the upper and lower windings of line relay 35 and extends them by way of armatures 56 and 59 and their working contacts, wipers 60 and 62, the bank contacts with which these wipers are in engagement, conductors 63 and 65 to the upper and lower windings of line relay 116 of the code switch F. Line relay 116, upon energizing over the calling subscriber's loop, closes a circuit for relay 117 at armature 134. Relay 117, upon energizing, grounds the release conductor 64 at armature 135 and its working contact, thereby completing a holding circuit for the switching relay 39 of the selector D before the slow acting release relay 36 has had time to fully deenergize, and at armature 137 prepares the circuit for the vertical magnet 128. Relay 117 at armature 136 and its working contact also completes an energizing circuit for relay 118, and said relay, upon energizing, completes an energizing circuit for its release relay 122 by the way of ground, working contact of armature 152 and said armature, armature 130 and its resting contact, conductor 153, relay 122 to battery. Release relay 122, upon energizing, opens the release circuit so that the release magnet 127 will not energize when the off normal springs 153 are closed on the first vertical step of the shaft.

The subscriber can now dial the first digit of the desired code, or the digit 4, as the code number 45 is the code number of the wanted subscriber. In response to the next operation of the calling device the line relay 116 is deenergized four times. Each time the line relay 116 deenergizes, it completes a circuit for the vertical magnet 128 as follows: From ground by way of armature 134 and its resting contact, armature 137 and its working contact, resting contact of off normal springs 154 and said spring, relay 119, and vertical magnet 128 to battery. By the operation of the vertical magnet 128, the shaft and wipers 161 and 162 of the code switch are raised step by step until the latter come to rest opposite the desired level of bank contacts, which in this case is the fourth level. The low wound relay 119 is energized in series with the vertical magnet 128 and being slow acting retains it armature attracted throughout the vertical movement, thereby maintaining its own circuit and that of the vertical magnet 128 intact after the off normal springs have been shifted, which occurs upon the first vertical step. At the end of the vertical movement, slow acting relay 119 deenergizes and transfers the operating circuit from the vertical to the rotary magnet.

The calling subscriber now manipulates his calling device in accordance with the second and last digit 5 in the desired code, thereby producing five interruptions in the circuit of the line relay 116. Each time the line relay 116 deenergizes in response to one of these interruptions, it closes a circuit for the rotary magnet 129 as follows: from ground by way of armature 134 and its resting contact, armature 137 and its working contact, normally open contacts controlled by off normal spring 154, armature 138 and its resting contact, resting contact of armature 143 and said armature, relay 120, and rotary magnet to battery. By the operation of the rotary magnet the wipers 161 and 162 are rotated into engagement with the fifth set of contacts on the fourth level. Relay 120 is energized in series with the rotary magnet 129 and, being slow acting, retains its armature attracted throughout the rotary movement. Upon energizing, relay 120 places a shunt around the resting contact of armature 143 and said armature at armature 140, and at armature 139 closes a circuit for relay 121. Relay 121, upon energizing, closes a locking circuit for itself at armature 142, and at armature 141 prepares a starting circuit for the interrupter relays 123 and 124.

At the end of the rotary movement, relay 120 deenergizes; opens its own circuit and that of the rotary magnet 129 at armature 140 so that any further movement of the subscriber's calling device will be ineffective in operating the rotary magnet; opens the initial energizing circuit of relay 121 at armature 139, and at the same time places ground upon the starting conductor 165 by way of the working contact of armature 141 and said armature. As soon as ground is placed upon the starting conductor 165, a circuit is closed by way of armature 156 and its resting contact, armature 148 and its resting contact for relay 123. Relay 123, upon energizing, closes a circuit for the motor magnet 155 of the impulse switch I at its armature 145. The motor magnet 155 is energized from ground on the starting conductor 165 by way of working contact of armature 145 and said armature, motor magnet 155 to battery. The motor magnet 155, upon energizing, opens the circuit of relay 123 at armature 156 and its resting contact. Relay 123, being slow acting, retains its armature attracted for an interval after which it falls back and opens the circuit to the motor magnet 155. Each time the magnet 155 energizes it attracts its armature, thereby causing it to engage another notch on the associated ratchet wheel, and each time the motor magnet 155 deenergizes, the associated wipers 157 and 158 are advanced into engagement with the next set of bank contacts.

The wipers 157 and 158 are shown in their normal positions, but as soon as the magnet 155 has energized and deenergized once the wipers are rotated onto the first set of bank contacts. When this occurs ground from conductor 153 is placed upon the pick up conductor 170 which is multipled to the top contact of each set of contacts in the fifth level of the code switch F. Since the wipers 161 and 162 are not in engagement with any contact in the fifth level this does not produce any result at this time. Ground is also placed on conductor 160 and maintained thereon by way of wiper 157 as long as said wiper is in an off normal position. This ground is placed on conductor 160 to maintain relay 121 in an operated position so that when the party answers said relay will be maintained in an operated position until the code has been completed.

On the next energization and deenergization of motor magnet 155, wiper 158 comes into engagement with conductor 171, and an energizing circuit is completed for relay 126 by the way of grounded conductor 153, wiper 158, second contact of the impulse switch bank, conductor 171, the top fifth bank contact in the fourth level, wiper 161 of the code switch, conductor 166, winding of relay 126, through resistance 164 to battery. Relay 126, upon energizing, completes a locking circuit for itself at armature 150 and its working contact from grounded starting conductor 165. Relay 126, at armature 149, prepares the circuit for operating the signals S and S′ and the relay 125, and also closes an energizing circuit for the relay 124 by way of grounded starting conductor 165, armature 156 and its resting contact, armature 148 and its working contact, and relay 124 to battery. Relay 124, upon energizing, completes a new energizing circuit for relay 123, which relay had its initial energizing circuit opened at armature 148 by the energization of relay 126. The energizing circuit for relay 123 may now be traced as follows: from ground by the way of armature 139 and its resting contact, working contact of armature 141 and said armature, conductor 165, armature 146 and its working contact, and relay 123 to battery. Relay 123, upon energizing, again closes an energizing circuit for motor magnet 155. The motor magnet 155, upon energizing, opens the circuit for relay 124 at armature 156 and its resting contact. The relay 124, being slow acting, retains its armature 146 attracted for an interval after which it falls back and opens the circuit to relay 123. Relay 123, being also slow acting, retains its armature 145 attracted for a short interval after which it falls away and opens the circuit to the motor magnet allowing said magnet to restore to normal. It can be readily seen that with this circuit arrangement, the motor magnet 155 is maintained energized longer with relay 124 in the circuit than when the relay 123 alone controls the movement of the wipers 157 and 158.

On the next energization of motor magnet 155, the closing of armature 156 and its working contact completes a circuit for ringing the signals S and S′ as follows: grounded conductor 165 by way of armature 156 and its working contact, working contact of armature 149 and said armature, conductor 169, and signals S and S′ to battery. At the same time the signals S and S′ are operated, an energizing circuit for relay 125 may be traced over a portion of the same circuit through the lower winding of relay 125. The relay 125 is a double wound differential relay and when said relay energizes as before stated, it completes a circuit for the upper winding with the result that said relay deenergizes and energizes in the same manner as a buzzer as long as the motor magnet maintains its armature 156 in an operated position. By the operation or buzzing of relay 125, signaling current is intermittently projected over the calling subscriber's loop as follows: battery by the way of the working contact of armature 147 and said armature, conductor 168, armature 133 and its resting contact, condenser 112, conductor 65, over the calling subscriber's loop to the upper winding of line relay 116. The difference in potential over the calling subscriber's loop caused by the operation of relay 125, produces a tone in the calling subscriber's receiver, whereby he can listen and tell if the proper code is being sent out.

When the motor magnet 155 deenergizes, the wipers 157 and 158 are advanced another step and at the same time the circuits for relay 125 and the signals S and S′ are opened at armature 156. Armature 156 returning to its normal position again completes an energizing circuit for relay 124 which relay again operates relay 123. Relay 123 again energizes the motor magnet 155 and said magnet on energizing, operates the signals, signals the calling subscriber, and opens the circuit of relay 124. The relays 124, 123, and magnet 155 then deenergize in the order named, whereby the wipers 157 and 158 are advanced another step. This sequence of operations continues until the wiper 158 comes into engagement with conductor 167, whereby the relay 126 is short circuited from grounded conductor 153 by way of wiper 158, and conductor 167 to the lower terminal of relay 126. Relay 126, upon deenergizing, opens the circuit for relay 124 at armature 148, opens the circuit for relay 125 and the signals S and S′ at armature 149, and at armature 150 opens its own locking circuit. Armature 148 returning to its normal position prepares again the original energizing circuit for relay 123. When the motor magnet again deenergizes the wiper 158 is advanced into engagement with conductor 166, whereby the relay 126 is again energized and performs the same functions as previously stated. The relays 123 and 124 and the motor magnet 155 are again operated in the same manner as previously explained, the signals being also operated each time the magnet 155 is energized. This operation continues until the wiper 158 comes into engagement with conductor 179, whereby the relay 126 is again short circuited by way of code switch wiper 162 which is in engagement with the lower contact of the fifth set of contacts in the fourth level of the code switch banks. On deenergizing, relay 126 opens the signaling circuit and again places the motor magnet under the sole control of relay 123. The operations just described are repeated as soon as the wiper 158 again engages its first contact, relay 126 being energized by way of wipers 158 and 161 as in the beginning.

When the called subscriber hears his code being sent out, he responds by taking the receiver off at the nearest substation, which we shall assume is the substation A′. When this occurs, the line switch C′ operates in the usual manner to extend the connection to an idle selector, which we shall assume is the selector D′, whereupon the line and release relays of the said selector energize and prepare the switch for operation in the usual manner.

The signaled subscriber may now operate the calling device at the substation A′ in accordance with the number which it is necessary to call in order to answer the code, thereby producing, responsive to the first digit, a number of interruptions in the circuit of the line relay of the selector D′. The selector D′ now raises its wipers to the desired level and rotates them in the usual manner to find the terminals of an idle connector switch, which we shall assume is the connector H, the connection being extended over conductors 66—68, inclusive. When the wipers of the selector D′ arrive upon the set of bank contacts in which the conductors 66—68, inclusive, terminate, it cuts through in the usual manner, whereupon the line relay 71 of the connector H energizes over the subscriber's loop in the usual manner. Line relay 71, upon energizing, at armature 83 and its working contact closes a circuit for release relay 72. Release relay 72, upon energizing, at armature 84 and its working contact connects ground to the conductor 67 whereby a holding circuit is established for the selector D′; at armature 85 and its working contact prepares the circuit for the switching relay 77, at armature 86 and its working contact prepares the circuit for the vertical magnet 78 and at the resting contact of the same armature opens the circuit for the release magnet 79.

The subscriber may now operate his calling device in accordance with the second digit of the number, thereby producing a corresponding number of interruptions in the circuit of the line relay 71 of the connector H. Each time the circuit of the line relay is interrupted said relay deenergizes and completes a circuit for the vertical magnet 78 as follows: from ground by way of armature 83 and its resting contact, armature 86 and its working contact, resting contact of off normal spring 102 and said spring, relay 73, and vertical magnet 78 to battery. By the operation of the vertical magnet 78, the shaft and wipers of the connector switch H are raised step by step until the latter comes to rest opposite the desired level of bank contacts in which the conductors 108—110, inclusive, terminate. The low wound relay 73 is energized in series with the vertical magnet 78 and being slow acting retains its armature attracted throughout the vertical movement, thereby maintaining its own circuit and that of the vertical magnet intact after the off normal springs have been shifted, which occurs on the first vertical step. At the end of the vertical movement the slow acting relay 73 deenergizes and transfers the operating circuit from the vertical to the rotary magnet.

The subscriber now manipulates his calling device in accordance with the third digit, thereby again interrupting the circuit of the line relay 71. Each time the line relay 71 deenergizes a circuit for the rotary magnet 80 is completed as follows: from ground by the way of armature 83 and its resting contact, armature 86 and its working contact, normally open contacts controlled by off normal spring 102, armature 87 and its resting contact, resting contact of armature 92 and said armature, armature 99 and its resting contact, and rotary magnet 80 to battery. By the operation of the rotary magnet the wipers 105—107, inclusive are rotated into engagement with the bank contacts associated with the conductors 108—110, inclusive. Relay 76 is energized in parallel with the rotary magnet and, being slow acting, retains its armatures attracted throughout the rotary movement so that the circuit for the rotary magnet is not opened when the wipers are passing over busy lines. When the wipers 105—107, inclusive, come to rest upon the bank contacts associated with the conductors 108—110, inclusive, an energizing circuit for the switching relay 77 is completed after the relay 76 returns to normal which extends as follows: from ground by the way of the working contact of armature 85 and said armature, armature 91 and its resting contact, upper winding of switching relay 77, resting contact of armature 94 and said armature, test wiper 106, bank contact associated with conductor 109 and said conductor, and resistance 114 to battery. The switching relay 77, upon energizing closes a locking circuit for itself at armature 98 and its working contact from grounded release conductor 67; at armature 99 and its resting contact opens the circuit of the rotary magnet so as to prevent any further movement of the wipers; at armature 97 and its working contact grounds the wiper 106 and thus prepares a locking circuit for relay 115 of the code switch F; and at armatures 96 and 100 connects generator in bridge of line wipers 105 and 107. When generator is applied to the line, relay 74 of the connector switch H and relay 115 of the code switch F are energized in series as follows: from booster battery or grounded generator, resting contact of armature 90 and said armature, armature 100 and its working contact, wiper 107, bank contact associated with conductor 110 and said conductor, resting contact of armature 131 and said armature, upper winding of relay 115 conductor 108 and its associated bank contact, wiper 105, working contact of armature 96 and said armature, armature 88 and its resting contact, and upper winding of a relay 74 to battery. Relay 74, upon energizing, completes a locking circuit for itself at armature 89 and its working contact from grounded release conductor 67, and at armatures 88 and 90 and their resting contacts disconnects generator, and at the working contacts of these armatures switches the connection through to the calling subscriber by way of conductors 111 and 112. Conductors 111 and 112 with their associated condensers are bridged across from the conductors 63 and 65 to conductors 108 and 110 as shown. The talking circuit now being completed the subscribers may converse in the usual manner.

Returning now to the point where relay 74 of the connector H was energized in series with relay 115 of the code switch F, the relay 115, upon energizing, completes a locking circuit for itself as follows: from ground by way of armature 97 and its working contact, wiper 106, bank contact and its associated conductor 109, working contact of armature 132 and said armature, and lower winding of relay 115 to battery. Relay 115 at armature 133 and its resting contact disconnects the tone conductor 168, at armature 131 and its resting contact opens the original energizing circuit of the relay 115 so that the resistance of the upper winding of relay 115 is removed from in bridge of the talking circuit, and at armature 130 and its resting contact opens the original energizing circuit of the release relay 122. The release relay 122, however, does not deenergize unless the code is finished and the wiper 157 is in its normal position. Should the called subscriber answer in the middle of a code, the apparatus would continue to operate until said code was finished due to the ground on wiper 157 maintaining the relays 121 and 122 energized. When the wiper 157 reaches its normal position ground is removed from the conductor 160 which allows the relays 121 and 122 to deenergize. Relay 121, upon deenergizing, removes ground from the starting conductor 165 at armature 141 and its working contact, whereby the circuits for relays 123, 124, 126 and magnet 155 are opened. Relay 122, upon deenergizing, completes a circuit for the release magnet 127 as follows: from ground by way of resting contact of armature 144 and said armature, off normal springs 153, and release magnet 127 to battery. The release magnet 127, upon energizing, returns the code switch shaft and wipers to their normal positions.

The calling and called subscribers may now converse together, or preferably the calling subscriber may inform the called subscriber to hang up and call him through the regular system so that the code switch will not be tied up. When the called subscriber hangs up the circuit for the line relay 71 of the connector H is opened at the substation A′ whereby said relay deenergizes and at armature 83 and its working contact opens the circuit of the release relay 72, and said relay, upon deenergizing completes the circuit for the release magnet 79 as follows: from ground by the way of armature 83 and its resting contact, armature 86 and its resting contact, off normal springs 101, and release magnet 79 to battery. The release magnet, upon deenergizing, returns the switch to its normal position.

The removal of ground from the release conductor 67 at armature 84 by the deenergization of relay 72, allows the selector D′ and lines switch C′ to return to their normal positions and at the same time opens the locking circuit of the switching relay 77. Relay 77, upon deenergizing, removes ground from the wiper 106 and conductor 109 whereby the circuit for relay 115 of the code switch F is opened allowing said relay to deenergize.

When the calling subscriber hangs up the circuit for relay 116 of the code switch F is opened at substation A, whereby said relay deenergizes and at armature 134 and its working contact opens the circuit for slow relay 117. Slow relay 117, upon deenergizing, opens the circuit of the slow relay 118 at armature 136 and its working contact, and at armature 135 and its working contact removes ground from the release conductor 64, whereby the holding circuit for the switching relay 39 of the selector D and line switch C is opened. Switching relay 39, upon deenergizing, completes an energizing circuit for the release magnet 40 as follows: from ground by way of resting contact of armature 58 and said armature, armature 50 and its resting contact, armature 52 and its resting contact, off normal springs 43, and release magnet to battery. Release magnet 40, upon energizing, returns the switch shaft and wipers to their normal position. The removal of ground from the conductor 64 opens the circuit for the switching relay 14 of the line switch C and said switch returns to its normal position in the usual manner when said relay deenergizes.

Should, however, the calling subscriber hang up first and the called subscriber, through some misunderstanding, fail to hang up the following operation takes place: The relays 116 and 117 deenergize and release the selector D and line switch C as previously explained, before the relay 118 has had time to deenergize. After an interval the slow acting relay 118 deenergizes and places a ground potential on the conductor 64 as follows: from ground by way of working contact of armature 130 and said armature, it being remembered that relay 115 is held energized by the called subscriber, armature 152 and its resting contact, resting contact of armature 135 and said armature, and conductor 64 to its associated bank contact. This ground potential makes the code switch F busy at the selector levels in the usual manner and it remains busy until the called subscriber hangs up. The release of the switches will then be the same as previously described.

Having described the operation intended of the selector system, an explanation and description of the connector system will be given. For this purpose, and referring to Figs. 4 and 3, it will be assumed that the subscriber at substation $A^2$ has called a certain other subscriber by way of the telephone at the latter's desk, and having received no response has released the connection and decided to try to reach the desired subscriber by sending out his code. It will be assumed as before that the code of the subscriber wanted is 45 which comprises four rings or buzzes, pause, and five rings or buzzes.

When the receiver is removed at substation $A^2$, a circuit is closed over line conductors 211 and 212 for the line relay 215 of line switch $C^2$. Line relay 215, upon energizing, places ground upon private normal conductor 213 at armature 221, thereby causing the line of substation $A^2$ to test busy to the automatic switches which have access to it, and also closes a circuit for switching relay 214 and stepping magnet 216 in series; and at armature 220 connects the test wiper 223 to a point midway between switching relay 214 and stepping magnet 216. The line switch $C^2$ is now operated in the usual and well-known manner to pick out an idle trunk line. Assuming that the trunk line extending to the connector H′ is the first one found to be idle, when the wipers 222—224, inclusive, arrive upon the set of bank contacts in which the trunk line comprising conductors 225—227, inclusive, terminates, switching relay 214 energizes in series with stepping magnet 216, not having energized before on account of being short circuited by the ground potential which is present upon test contacts of busy trunk lines. Stepping magnet 216, however, does not energize in series with switching relay 214 on account of the relatively high resistance of the latter. Upon energizing, switching relay 214 disconnects test wiper 223 from the point between its own winding and that of stepping magnet 216 and connects it to grounded private normal conductor 213 at armature 218, thereby making the seized trunk busy immediately by placing a ground potential upon release trunk conductor 226. As a further result of the energization of switching relay 214, it disconnects the line conductors 211 and 212 from the winding of line relay 215 and ground, respectively, and extends them by way of armatures 217 and 219 and their working contacts, wipers 222 and 224, and conductors 225 and 227, to the upper and lower windings of line relay 235 of connector H′.

Line relay 235 now energizes over the calling subscriber's loop and at its armature 246 closes a circuit for release relay 236. Relay 236, upon energizing, at armature 249 and its working contact opens the circuit for the release magnet 244, and at its working contact prepares the circuit for the vertical magnet 243; at armature 248 and its working contact prepares the circuit for the switching relay 242; and at armature 247 and its working contact grounds the release conductor 226, whereby a holding circuit for the line switch $C^2$ is established before the slow acting relay 215 has had time to deenergize.

The subscriber may now operate his calling device in accordance with the first digit with which it is necessary to call in order to seize the code switch. By the operation of the calling device the circuit for the line relay 235 is intermittently opened. Each time the circuit for the line relay 235 is opened said relay deenergizes and a circuit may be traced for the vertical magnet 243 as follows: from ground by the way of armature 246 and its resting contact, armature 249 and its working contact, resting contact of off normal springs 265 and said spring, slow acting relay 237, and vertical magnet 243 to battery. By the operation of the vertical magnet the shaft and wipers of the connector H′ are raised step by step until they are opposite the desired level in which the conductors 270 to 272, inclusive terminate. Relay 237 is energized in series with the vertical magnet, and being slow acting, retains its armature attracted throughout the vertical movement, thereby maintaining its own circuit and that of the vertical magnet intact after the off normal springs have been shifted, which occurs on the first vertical step. A short interval after the vertical movement is finished, the slow acting relay 236 deenergizes and switches the operating circuit to the rotary magnet 245.

The subscriber may now manipulate his calling device in accordance with the second digit necessary to seize the code switch F. The line relay 235 is again intermittently deenergized and energized. Each time the line relay 235 deenergizes, a circuit may be traced for the rotary magnet 245 as follows: from ground by the way of armature 246 and its resting contact, armature 249 and its working contact, normally open off normal springs controlled by off normal spring 265, armature 250 and its resting contact, resting contact of armature 253 and said armature, armature 262 and its resting contact, and rotary magnet 245 to battery. A branch of this circuit also extends to the relay 241. By the operation of the rotary magnet the shaft and wipers are rotated step by step until they come in engagement with the bank terminals 276 to 278, inclusive. Cam springs 266 and 275 are mounted on the connector switch frame in such a position and manner that said springs are operated by a cam on the shaft, said cam engaging spring 275 just before said shaft and wipers are rotated to a certain set of contacts in a certain level, the code contact set, which is preferably the last set of contacts in the desired level. By this operation the spring 266 is moved out of engagement with its resting contact and is moved into engagement with its working contact when the wipers 267—269, inclusive, come into engagement with the bank terminals 276—278, inclusive.

When the rotary magnet is operated, the slow acting relay 241 is energized in parallel therewith. Relay 241, upon energizing places a shunt around the armature 253 and its resting contact, so that the circuit for the rotary magnet will not be opened when the wipers are passing over busy contacts, and at armature 257 prepares a circuit for the testing relay 240. The operation now depends upon whether the code switch F is busy or idle. If the code switch F is busy, there will be a ground potential on conductor 271. Relay 240 will then energize as follows: from ground by the way of armature 130 of the code switch F, armature 152 and its resting contact, resting contact of armature 135 and said armature, release conductor 271, bank contact 277, test wiper 268, armature 257 and its working contact, and relay 240 to battery. Relay 240, upon energizing, opens the circuit for the rotary magnet at armature 253 and its resting contact, at armature 252 and its resting contact opens a point in the circuit of the switching relay 242 so that said relay cannot energize, at its working contact prepares a locking circuit for itself, and at armature 256 and its working contact connects the busy machine to the calling subscriber's line in the usual manner, whereby he is informed that the code switch is in use. Relay 241, a short interval after the rotary movement, deenergizes and completes the locking circuit for relay 240 as follows: from ground by way of working contact of armature 248 and said armature, armature 252 and its working contact, normally closed springs controlled by the armature 257, and relay 240 to battery. The calling subscriber hangs up as soon as he is informed that the code switch is busy, where by the switches are released in the usual manner.

Assuming that the code switch F is idle, there will be no ground potential on the bank terminals 277 and after a short interval the slow relay 241 deenergizes without having completed a circuit for the busy relay 240. Under these conditions a circuit for the switching relay 242 and the release relay 122 of the code switch F may be traced as follows: from ground by the way of the working contact of armature 248 and said armature, armature 252 and its resting contact, upper winding of switching relay 242, resting contact of armature 257 and said armature, test wiper 268, bank terminal 277, conductor 271, armature 135 and its resting contact, resting contact of armature 152 and said armature, armature 130 and its resting contact, conductor 153, and relay 122 to battery. The switching relay 242 and release relay 122 are energized in series over the above traced circuit. Switching relay 242, upon energizing, locks itself to grounded release conductor 226 at armature 261 and its working contact, at armature 262 opens the circuit of rotary magnet 245 and prepares a circuit for the vertical magnet 128 of the code switch F, at armature 259 and its working contact prepares a circuit for the cut off relay 239, at armature 263 and its working contact closes another point in the circuit for the vertical magnet of the code switch F, and at armature 260 and its working contact completes a holding circuit for the release relay 122 of the code switch F as follows: from ground by way of armature 260 and its working contact, wiper 268, bank contact 277, conductor 271, armature 135 and its resting contact, resting contact of armature 152 and said armature, armature 130 and its resting contact, and relay 122 to battery. The release relay 122 of the code switch F, upon energizing opens the circuit of the release magnet 127 at armature 144 and its resting contact.

The subscriber may now manipulate his calling device in accordance with the first digit of the code or digit 4, whereby the circuit for the line relay 235 is intermittently opened four times. The line relay 235 of the connector H in response to its circuit being intermittently opened deenergizes four times, whereby a circuit may be traced for the vertical magnet 128 of the code switch F as follows: from ground by the way of armature 246 and its resting contact, armature 249 and its working contact, normally open off normal springs controlled by the spring 265, armature 250 and its resting contact, resting contact of armature 253 and said armature, armature 262 and its working contact, working contact of cam spring 266 and said spring, resting contact of armature 255 and said armature, armature 263 and its working contact, wiper 269, bank contact 278, conductor 272, resting contact of off normal spring 154 and said spring, relay 119, and vertical magnet 128 to battery. By the operation of the vertical magnet the shaft and wipers 161 and 162 of the code switch F are raised step by step until the latter come to rest opposite the desired level of bank contacts, the operation of the code switch during the vertical movement being the same as previously described in the selector system.

The subscriber may now manipulate his calling device in accordance with the last digit of the code, or digit 5. The line relay 235 of the connector H′ deenergizes five times and this time completes an energizing circuit to the rotary magnet 129 of the code switch F, as follows: from ground by way of armature 246, over the previously traced circuit to conductor 272 and thence by way of, normally open off normal springs controlled by spring 154, armature 138 and its resting contact, resting contact of armature 143 and said armature, slow acting relay 120, and rotary magnet 129 to battery. The operation of the code switch F and impulse switch I from here on is the same as previously described in the selector system. By the operation of relay 125 signaling current is intermittently projected over conductor 168 by way of armature 133 and its resting contact, condenser 113, conductor 270, bank contact 276, wiper 267, working contact of armature 259 and said armature, armature 254 and its resting contact, to the upper winding of relay 239, whereby a current is induced in the lower winding of relay 239, by which an induced tone may be heard in the calling subscriber's receiver each time the signals S and S′ are operated, whereby said subscriber can listen and tell whether the proper code is being rung, said circuit being traced as follows: from battery by way of lower winding of relay 239, lower winding of relay 238, over the subscriber's loop back to upper winding of relay 238 to battery.

When the called subscriber hears his code being sent out, he responds by taking the receiver off at the nearest substation which we shall assume is the substation $A^3$. When this occurs, the line switch $C^3$ operates in the usual manner to extend the connection to an idle connector, which we shall assume is the connector $H^2$, whereupon the line and release relays of said connector energize and prepare the switch for operation in the usual manner.

The signaled subscriber may now operate the calling device at the substation $A^3$ in accordance with the number which it is necessary to call in order to answer the code, thereby operating the line relay of the connector $H^2$. The connector $H^2$ now raises its wipers to the desired level and rotates them in the usual manner to the bank terminals 279—281, inclusive, which terminals are the answering terminals in the connector system.

There being no ground on the bank terminal 280 the switching relay 342 of the connector $H^2$ and relay 115 of the code switch F energize in series, the circuit extending as follows: from ground by the way of working contact of armature 348 and said armature, armature 352 and its resting contact, upper winding of switching relay 342, resting contact of armature 357 and said armature, wiper 368, bank contact 280, conductor 273, and lower winding of relay 115 to battery. Relay 115 of the code switch F, upon energizing, opens the original energizing circuit of release relay 122 at armature 130 and its resting contact, and at its working contact connects ground to the release conductor 271, by way of armature 135 and 152, so that should the calling subscriber hang up first the code switch F would be made busy until the called subscriber hung up. Switching relay 342, upon energizing, completes a locking circuit for itself at armature 361 and its working contact, at armature 360 and its working contact completes a new circuit for relay 115, at armature 359 and its working contact prepares a circuit for cut-off relay 339, and at armature 363 and its working contact connects generator to the calling connector through the bank multiples of the calling and answering terminals of the code switch F. The negative bank contact 279 of the answering terminal is multipled to the positive bank contact 278 of the calling terminal, and the positive bank contact 281 of the answering terminals is multipled to the negative bank terminal 276 of the calling terminals as shown. When generator is applied to the calling connector a circuit for relay 239 may be traced as follows: from generator by the way of resting contact of cam spring 366 and said spring, resting contact of armature 355 and said armature, armature 363 and its working contact, wiper 369, bank contact 281, conductor 270, bank contact 276, wiper 267, working contact of armature 259 and said armature, armature 254 and its resting contact and upper winding of relay 239 to battery. Relay 239, upon energizing over the above traced circuit, completes a locking circuit for itself at armature 251 and its working contact; at armature 254 opens the original energizing circuit for relay 239 at its resting contact and at its working contact prepares a portion of the talking circuit, at armature 255 and its working contact prepares a portion of the talking circuit and also completes a circuit for the cut-off relay 339 of connector $H^2$. The circuit for relay 339 may be traced as follows: from ground by way of working contact of armature 247 and said armature, working contact of armature 251 and said armature, lower winding of relay 238, working contact of armature 255 and said armature, armature 263 and its working contact, wiper 269, bank contact 278, conductor 272, bank contact 279, wiper 367, working contact of armature 359 and said armature, armature 354 and its resting contact, and upper winding of cut-off relay 339 to battery. Relay 339, upon energizing, locks itself through its lower winding to grounded release conductor 326 at armature 351 and its working contact, at armature 355 and its resting contact disconnects generator, at armature 354 and its resting contact opens the original energizing circuit of relay 339, and at armatures 354 and 355 and their working contacts completes the talking circuit between the two subscribers. The talking circuit being multipled through the calling and answering terminals of the code switch F, the code switch is released, after furnishing the code, in the same manner as described in the selector system, the relay 115, however, being maintained energized until the called subscriber hangs up.

When the subscribers replace their receivers the line switches $C^2$ and $C^3$, and connectors H′ and $H^2$ release and return to their normal positions in the usual manner. The removal of ground from conductor 273 caused by the deenergization of relay 342, allows relay 115 of the code switch F to restore to normal. The code switch F is now availabe to send out another code.

In some systems of this type it is desirable to have the code switch send out special rings or buzzes when certain numbers are called. These special rings may be used for fire alarm or other purposes, and are accomplished very simply without changing the circuits or construction of the code switch. The top level of the bank of the code switch F shows a few of these arrangements whereby the special rings may be sent out.

Assuming that a calling subscriber calls 61 on the code switch, the wipers 161 and 162 come to rest on the first set of bank contacts in the sixth level. The wipers 157 and 158, of the impulse switch I are started rotating in the usual manner. The wiper arm 158 is rotated until it comes into engagement with the contact of conductor 166, whereby relay 126 is energized from ground on conductor 153 as previously explained. As relay 126 controls the ringing of the signals S and S′ said relay must first be energized before said signals can be rung. When the motor magnet 155 is energized to continue the rotation of the wiper arms a circuit is closed for ringing the signals S and S′ as previously described. When the wiper 158 reaches the contact associated with conductor 175, a circuit is closed through wiper 162 for short circuiting relay 126, whereby said relay is deenergized. The wiper 158 continues to rotate until it again comes into engagement with the contact associated with conductor 166 and the same cycle of operation is completed until the calling party hangs up or the called party answers. By this arrangement one ring or buzz is sent out at regular intervals.

Another, or continuous ringing arrangement is shown at the last set of contacts in the sixth level. This set of bank contacts has no wires attached thereto with the result that when the wipers 161 and 162 are in engagement therewith and when the wiper arm 158 reaches conductor 166, relay 126 is energized and remains energized until said relay is shunted out by ground from the wiper arm 158 engaging with conductor 167, immediately after which it again energizes, when wiper 158 comes into engagement with conductor 166. By this arrangement a plurality of long series of rings or buzzes are sent out from the code switch. The same cycle is repeated until the calling party hangs up or the called party answers, whereby the code switch is released in the usual manner.

The various features of the invention, having been described and ascertained, will now be pointed out in the appended claims.

What I claim is:

1. In a telephone system, a code selecting switch having two sets of terminals associated therewith, selector switches having a directively controlled primary movement and an automatically controlled secondary movement, said selector switches having access to said code selecting switch through only one of said sets of terminals, connector switches having directively controlled primary and secondary movements, said connector switches having access to said code selecting switch through only the other of said sets of terminals, signals, and means for operating said code selecting switch from either of said selector or connector switches for operating said signals in accordance with a predetermined code.

2. As an article of manufacture, a code selector switch comprising means controllable by a calling subscriber for selecting a code and means for actuating a signal in accordance with the code selected, said code selector having two sets of terminals and associated circuit arrangements whereby it is adapted for use either in a system wherein it is accessible to final connectors or in a system wherein it is accessible to trunk hunting selectors.

3. In a code ringing machine, a pair of step by step switches, the bank terminals of one switch being arranged in pairs, said pairs arranged in vertical and horizontal rows, the bank terminals of the other switch consisting of a single row of bank terminals, a group of conductors connected at one end to contacts in the bank of said second switch and multipled horizontally at the other end in the bank of said first switch, and a second group of conductors connected at one end to contacts in the bank of said second switch and multipled vertically at the other end in the bank of said first switch.

4. In a code ringing machine, a pair of step by step switches having wipers, and two groups of permanent conductors connecting the bank terminals of one switch with the bank terminals of the other switch, the bank terminals of one switch consisting of pairs arranged in vertical and horizontal rows, the bank terminals of the other switch consisting of a single row of bank terminals, one of said groups of conductors being multipled horizontally and the other of said groups of conductors being multipled vertically to the bank terminals of said one of said switches, each conductor in said last mentioned group to be multipled in one vertical row only, and permanent conductors connecting the wipers in said one switch with bank terminal of said other switch.

5. In a code ringing machine, a first step by step switch and a second step by step switch, said first switch having two operating speeds controlled by said second switch, and subscriber controlled means for operating said second switch step by step to control the operation of said first switch at both speeds.

6. In a code ringing machine, a first step by step switch having motion in a forward direction only, a second step by step switch having motion in two planes, said first switch having two operating speeds automatically controlled by said second switch, and subscriber controlled means for operating said second switch to control said first switch to operate at both speeds.

7. In a code ringing machine, a first step by step switch and a second step by step switch, subscriber controlled means for operating said first switch to select a predetermined code, signals, means for operating said second switch at a certain speed to operate said signals in accordance with said predetermined code, and means for increasing the speed of said second switch before and after said signals are operated.

8. In a code ringing system, subscriber controlled means for selecting a code, a signal, an automatic switch continuously operable to actuate said signal at intervals in accordance with the selected code, and means for automatically changing the speed of said switch during the silent periods.

9. In a code ringing system, a signal, an automatic progressively movable switch, means for operating said switch to intermittently operate said signal, means for causing a cessation in the operation of said signal for a definite interval while said switch continues to move, and means for changing the speed of said switch during said interval.

10. In a code ringing system, a signal, an automatic progressively movable switch, means for operating said switch to intermittently operate said signal, means for causing a cessation in the operation of said signal for a definite interval while said switch continues to move, and means for increasing the speed of said switch during said interval.

11. In a telephone system, a pair of switches, one of said switches having movement in a forward direction only and having two operating speeds, and means controlled by the other of said switches for operating said one switch at both operating speeds.

12. In a code ringing machine, a code selecting switch having a step by step primary and step by step secondary movement, means for operating said switch to select a code, signals permanently connected with said switch, and code generating mechanism for automatically operating said signals a plurality of times corresponding, respectively, to the number of steps taken by said code selecting switch in its two movements.

13. In a code ringing machine, a code selecting switch having step by step primary and step by step secondary movement, means for operating said switch to select a code, signals permanently connected with said switch, and code generating mechanism for automatically operating said signals a first time a plurality of times corresponding to the number of steps taken by said code selecting switch in its primary movement and for then automatically operating said signals a second time a plurality of times corresponding to the number of steps taken by said code selecting switch in its secondary movement.

14. In a private branch exchange system, a plurality of special signals located at different points in the system, a common circuit for actuating all said signals simultaneously in order to notify a party at some unknown point that he is wanted, a code selector switch having step by step primary and step by step secondary movement, a controlling switch, means under control of the calling party for setting said code selecting switch to signal the particular party wanted, and circuit connections whereby said controlling switch is operated automatically thereafter to close said signaling circuit a plurality of times corresponding, respectively, to the number of steps taken by said code selecting switch in its two movements.

15. In a telephone system, a pair of connected terminals common to the exchange, telephone call and answer numbers assigned to said terminals, respectively, automatic switching mechanism controlled by a calling subscriber in accordance with the call number for extending a connection to the call terminal and applying ground thereto, means for then signaling the called subscriber, automatic switching mechanism controlled by the called subscriber in accordance with the answer number for extending a connection to the answer terminal whereby the calling and called subscribers are telephonically connected, means responsive to the hanging up of the receiver by the calling subscriber for removing said ground from the call terminal to allow said calling subscriber's automatic switching mechanism to release, and means for again connecting ground to the call terminal whereby said call terminal is made busy until the called subscriber hangs up.

16. In a private branch exchange system, a plurality of special signals located at different points in the system, a common circuit for actuating all said signals simultaneously in order to notify a party at some unknown point that he is wanted, means for bringing said circuit under the control of the calling subscriber, means for thereafter causing said signals to be actuated in accordance with a predetermined code, and means for producing an induced tone in the receiver of the calling subscriber each time said signals are actuated whereby the calling subscriber can ascertain if the proper code is being sent out.

17. In a signaling system, a plurality of special signals located at different points in the system, a common circuit for actuating all said signals simultaneously in order to notify a party at some unknown point that he is wanted, a ringing relay for controlling said circuit to operate said signals, a circuit for said ringing relay, a control relay for controlling the circuit of said ringing relay to cause the latter to close and open the said common circuit to operate said signals in accordance with a particular code, and a progressively movable switch having a set of contacts and a wiper movable thereover for controlling the action of said control relay.

18. In a telephone system, a plurality of special signals located at different points in the system, a common circuit for actuating all said signals simultaneously in order to notify a party at some unknown point that he is wanted, and means controlled by a calling subscribed for operating said signals in accordance with a predetermined code, said means consisting of a control relay, a progressively movable interrupter switch, a second switch having a pair of wipers operable to connect said control relay to different sets of contacts of said interrupter switch, a circuit variably controlled by said control relay, and a ringing relay in the circuit controlled by said control relay for first operating said signals a number of times and then a further number of times after a pause, the code depending upon which contacts of the interrupter switch the control relay is connected to.

19. In a code ringing machine a subscriber controlled code selector switch, an automatically operated interrupter switch, permanent connections between the banks of said switches, a ringing relay in said code selector switch and a circuit for said ringing relay, a control relay in said selector switch having both its terminals permanently connected to both the wipers of said code selector switch and bank contacts of said interrupter switch, a circuit for said control relay closed by said interrupter switch over said bank connections, said control relay closing said circuit for the ringing relay upon energizing, and opening said circuit upon deenergizing.

20. In a code ringing machine, a subscriber controlled code selector switch, an automatic code interrupter switch, a ringing relay in said selector switch and a motor magnet for said interrupter switch, a circuit for energizing said motor magnet, and means whereby said ringing relay is energized only during the time said motor magnet is in an energized position.

21. In a telephone system, a code selecting switch having two sets of terminals associated therewith, trunk hunting selector switches, final connector switches, only one of said sets of terminals accessible to said selector switches, the other of said sets of terminals accessible to only said connector switches, signals, and means for operating said code selecting switch from either said selector or connector switches for operating said signals in accordance with a predetermined code.

22. In a telephone system, a code selecting switch accessible to trunk hunting selectors and final connectors, signals, and means for operating said code selecting switch from either said selectors or connectors to operate said signals in accordance with a predetermined code.

23. In a telephone system, a code selecting switch having calling and answering terminals associated therewith, selector switches having access to said calling terminals, and connector switches having access to said answering terminals.

24. In a telephone system, selector switches having access to connector switches, the terminals of said connector switches terminating in the banks of said selector switches, subscriber's lines terminating in the banks of said connector switches, a code selecting switch having calling terminals accessible to said selector switches and answering terminals accessible to said connector switches.

25. In a telephone system, a code selecting switch having two sets of calling terminals and two sets of answering terminals associated therewith, trunk hunting selector switches, final connector switches, only one of said sets of calling terminals accessible to said selector switches, the other of said sets of terminals accessible to only said connector switches, signals, and means for operating said code selecting switch through said calling terminals from either said selector or connector switches for operating said signals in accordance with a predetermined code.

26. In a telephone system, a code selecting switch having two sets of calling terminals and two sets of answering terminals associated therewith, trunk hunting selector switches, final connector switches, only one of said sets of calling terminals accessible to said selector switches, the other of said sets of terminals accessible to only said connector switches, signals, means for operating said code selecting switch through said calling terminals from either said selector or connector switches for operating said signals in accordance with a predetermined code, and means for operating said connector switches to seize said answering terminals to answer a call and stop the operation of said signals.

27. In a code ringing machine, a pair of step by step switches, the bank terminals of one switch arranged in groups, the bank terminals of the other switch consisting of a single row of bank terminals, a group of conductors connected at one end only to contacts in the first half of the bank of said second switch, each conductor in said group of conductors connected to each terminal in one of said groups of terminals in said first switch, a second group of conductors connected at one end only to contacts in the second half of the bank of said second switch, each of said last mentioned group of conductors connected to one of said terminals in each of said groups of terminals.

28. In a code ringing switch, a pair of step by step switches, the bank of one switch consisting of a single row of contacts, the bank terminal pairs of said second switch arranged in longitudinal rows, said pairs being so spaced therein as to form vertical rows comprising one contact pair from each of several horizontal rows, bank connections between said switches comprising a group of conductors extending from the contacts in the first half of said first bank to the corresponding horizontal rows in said second bank and a second group of conductors from the contacts in the second half of said first bank to the corresponding vertical rows in said second switch and circuit means extended through said banks for controlling said code ringing machine.

29. In a remote control system, a controlling station, a substation, a two-wire controlling circuit between said controlling station and said substation, a two-coordinate electro-magnetic switch at the substation, means whereby said switch may be set to a selected position from the controlling station over said controlling circuit for selecting a particular control, and means including a single stepping switch whereby after the setting of said two-coordinate switch two distinctive trains of signals are automatically sent from the substation over the controlling circuit to indicate the position to which the said two-coordinate switch has been set.

30. In a remote control system, a controlling station, a substation, a controlling circuit between said controlling station and said substation, a two-coordinate switch, means whereby said switch may be set to a selected position from the controlling station over said controlling circuit for selecting a particular control, and means including a single stepping switch for sending two distinctive trains of audible signals from the substation over said controlling circuit responsive to the setting of the first switch to indicate the position to which said two-coordinate switch is set.

31. In a remote control system, a controlling station, a substation, a controlling circuit between said controlling station and said substation, means at said substation for effecting the control, a two-coordinate switch and means whereby said switch may be set to a selected position from the controlling station over said controlling circuit for selecting said control, means including a single stepping switch for transmitting two distinctive trains of signals over said controlling circuit responsive to the setting of said two-coordinate switch to indicate its setting, and means whereby said two trains of signals are repeated in succession.

32. In a telephone system, a code selecting switch accessible to trunk hunting selectors and finder connectors, signals, means for operating said code selecting switch from either said selectors or connectors to repeatedly operate the signals in accordance with a predetermined code.

In witness whereof, I hereunto subscribe my name this 20th day of June, A. D. 1927.

MARTIN L. NELSON.